(12) United States Patent
Berens

(10) Patent No.: US 6,936,759 B2
(45) Date of Patent: Aug. 30, 2005

(54) TEACHING METHOD AND TEMPLATE TO MAKE A GUIDE TO TEACH PIANO

(76) Inventor: Christopher Berens, 201 SW. 1st St., No. 2, Boca Raton, FL (US) 33432

( * ) Notice: Subject to any disclaimer, the term of this patent is extended or adjusted under 35 U.S.C. 154(b) by 63 days.

(21) Appl. No.: 10/444,779

(22) Filed: May 23, 2003

(65) Prior Publication Data

US 2004/0231491 A1 Nov. 25, 2004

(51) Int. Cl.$^7$ ............................................. G09B 15/08
(52) U.S. Cl. ..................... 84/478; 84/477 R; 84/470 R; 84/471 R; 84/479 A
(58) Field of Search ............................. 84/478, 477 R, 84/470 R, 471 R, 479 A

(56) References Cited

U.S. PATENT DOCUMENTS

| | | | |
|---|---|---|---|
| 2,347,950 A | 5/1944 | Huish | |
| 3,678,796 A | 7/1972 | Puopolo | |
| 3,850,072 A | 11/1974 | Fuller | |
| 4,060,901 A | * 12/1977 | Jamerson | 33/483 |
| 4,361,070 A | 11/1982 | Huiner | |
| 4,444,083 A | 4/1984 | Apel et al. | |
| 5,254,008 A | 10/1993 | Dawson | |
| 5,524,522 A | 6/1996 | Hesnan | |
| 5,574,238 A | 11/1996 | Mencher | |

* cited by examiner

Primary Examiner—Shih-Yung Hsieh
(74) Attorney, Agent, or Firm—Frank J. Benasutti

(57) ABSTRACT

A plastic template is disclosed with elongated slots and circular holes in it. The template can be put on a piece of paper and by running pencil through the various slots, all of the scales, chords, and intervals can be produced on the paper to form a guide. The guide can then be moved along the space between the keys and the fallboard of the piano, so that all of these scales can be played by anyone placing their fingers on the keys indicated by the lines on the guide.

The edge of the template has small notches in it, so that marks can be made for the lines for music staves which can then be drawn. The template has circular holes in it above the slots. The circles can then be used by placing them over these lines and then marking them with a pencil to indicate various notes of the given musical structure.

12 Claims, 4 Drawing Sheets

TEACHING METHOD AND TEMPLATE TO MAKE A GUIDE TO TEACH PIANO

BACKGROUND OF THE INVENTION

1. Technical Field

This invention relates to a method of teaching piano by the use of guides created by a template; and to a template for creating such guides.

2. Background Art

For years, piano teachers have sought to create ways to make it easier for students to learn the correlation between the sheet music and playing the keys which will produce the music. This has led them to develop music aids for the learning process, which seek to reduce the complexity of the piano by introducing physical devices in that process. For example, U.S. Pat. No. 4,444,083 teaches the use of templates that are placed over piano keys as an aid in learning how to play. See FIG. 1 of this patent. U.S. Pat. No. 4,361,070 teaches placing cover strips over keys with display elements on the keys to teach students to play the keyboard. U.S. Pat. No. 5,254,008 teaches overlays on piano keys as a device for learning music. The covered overlay on the keyboard enables one to visualize, but not play the piano. U.S. Pat. No. 5,574,238 teaches a musical notation for keyboard instruments where a mark is placed on the keys.

Musical slide rules have also been designed, such as in U.S. Pat. No. 5,524,522 and U.S. Pat. No. 3,678,796. These are not placed on the keyboard, but do show scales. Thus, they are designed to teach a relationship between the board and scales. These are not users' tools in the sense that they do not teach people how to play.

U.S. Pat. No. 2,347,950 discloses a chart for teaching the piano that goes behind the keyboard. Fingers from the chart come out over the white keys and are colored to correspond to colored notes in the music.

SUMMARY OF THE INVENTION

I have invented a template with elongated slots and circular holes in it which can be put on a piece of paper and by running pencil through the various slots, all scales, chords and intervals can be produced. The paper can then be moved along the space between the keys and the backboard of the piano, so that all of these scales can be played by anyone placing their fingers on the keys opposite to the lines of the scales.

The edge of the template has small notches in it, so that the lines for music can be marked and then drawn on a separate piece of paper. The circles can then be used on these lines to indicate various notes.

The purpose of the tool is to create the method. The purpose of the method is to enable a piano student to play complex scales, chords and intervals in every key by the use of the guides created by the template. The way in which this works is by visual markers, rather than cognitive processes. The guide uses markers that point to the keys to be played. This enables the student to play immediately. The student will now be able to play regardless of being able to read music or understand higher musical structures. It enables the student to enjoy learning rather than it being such a complex task.

The method will also enable students to start piano lessons at a much earlier age. This method will aid greatly in strengthening fingers and developing the ear. It will instill knowledge of scale and chord structures both in a concrete and abstract manner.

The template guide method allows the student, of any age, to play piano quickly and easily. This increases motivation and enthusiasm to continue learning how to play piano. The template/guide method is a teaching and learning tool that will enhance the knowledge of musical scalar, chordal and intervallic structure by use of visual guides.

DESCRIPTION OF THE PREFERRED EMBODIMENTS

I have created a tool and method that will enable a piano student to play complex scales chords and intervals. Using my template method, a student, child or adult, may be able to play complex musical structures within minutes of introducing this method to them. They are able to play major scales in a chromatic (moving from one note to the next without skipping any notes) manner. This means that a new student, at the end of their first one-hour piano lesson, will be playing major and minor scales (natural, harmonic and melodic) in any or every key. They may be able to play diminished and whole tone scales by the end of this first lesson as well. In addition to all of the scales this same student will be able to play major and minor, diminished, augmented and suspension chords in every key.

The template that I have developed enables the user to create a guide. By using my template method and guide one can represent any musical structure, such as a scale, chord or interval. This guide can then be used to play any of these structures immediately.

A standard piano is made up of 88 keys. On most pianos there are 52 white keys and 36 black keys. The keys on the piano appear as if the white key is larger than the black key. The white key does have more surface area than the black key. The key centers of every key is actually equal in its spacing from the next key. The center of one note is as far away as the center of the next. For example, this space from note center to note center is normally approximately $9/16^{th}$ of an inch.

Music uses the first 7 letters of the alphabet to describe the pitches (tones) that may be played at any given time during a musical composition. The letters A, B, C, D, E, F and G represent all white notes of the piano keyboard. The black notes are named a little differently. First of all they are called accidentals and can be described as being sharp (raised) or flat (lowered). When a note is either sharp or flat it is described as the letter name of whatever white note was raised or lowered. The main point of this explanation is that there are 12 different tones in a complete chromatic scale. At the $13^{th}$ note of that chromatic scale (playing every note in immediate succession of the previous and not skipping over any notes) is the first note repeated one octave higher.

Figure 1:
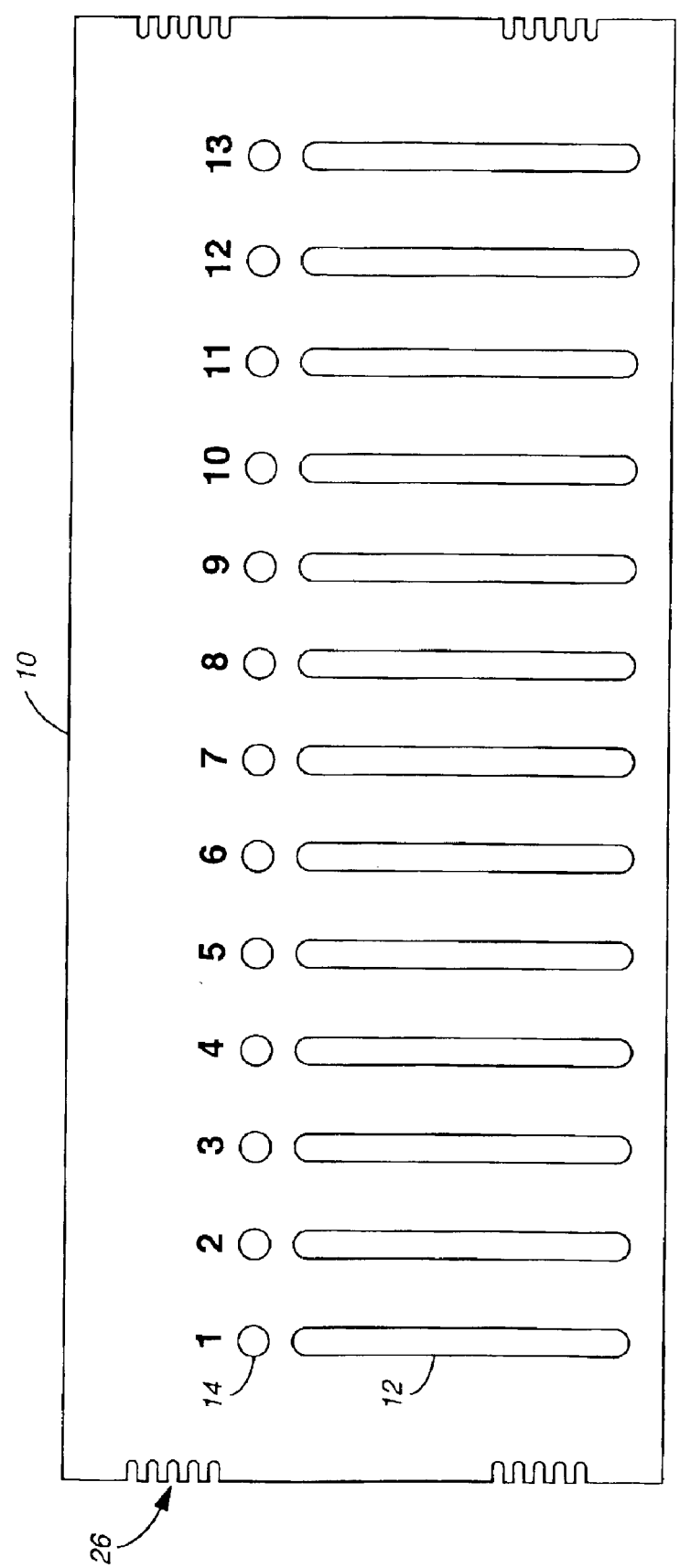
FIG. 1 is a plan view of a template in accordance with my invention.

The template 10, FIG. 1, is preferably constructed of flexible plastic approximately 3×8-¼ inches. There are thirteen vertical slots 12 approximately 1-½ inches in length and ⅛ of inch wide. The slots are spaced approximately 9/16 of an inch apart. The bottoms of these slots are approximately 3/16 of an inch above the bottom of the tool itself to keep lines of the guide which is created in close proximity to the keys. Above each slot is a small hole 14 and above each hole is a number from 1 to 13 from left to right.

Figure 3:
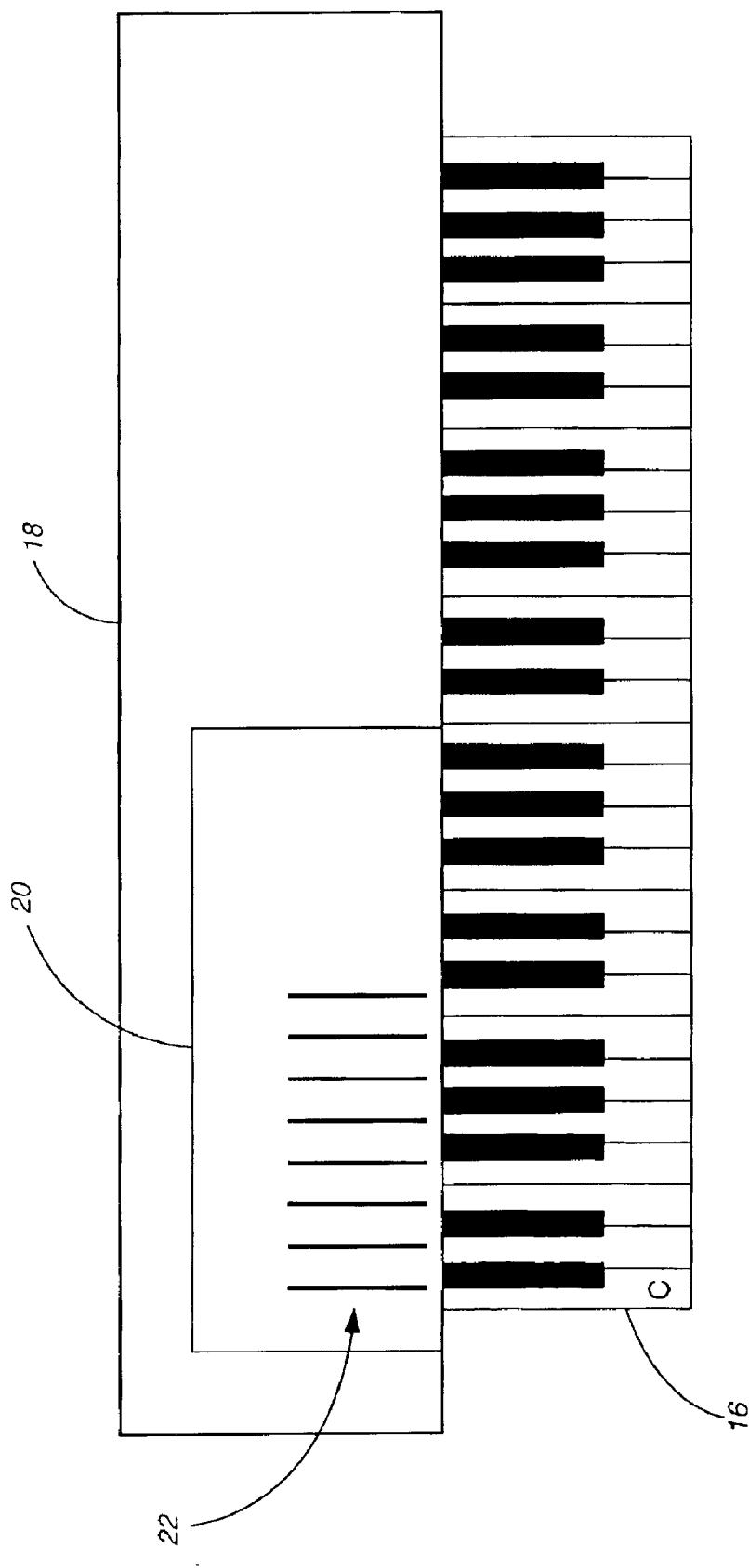
FIG. 3 is a diagram showing placement of the guide in relation to a piano keyboard.

The way a standard piano is constructed is with the keys 16, FIG. 3 (the black and white notes) arranged flat. The fallboard 18, FIG. 3, is the key cover that sits at the back of the keyboard and is usually at a 90 degree angle to the keyboard when it is open. There is a small space between the fallboard and the keyboard where a piece of paper 20 can be placed and moved to the right or left by sliding. By placing this paper up against the fallboard it would be completely visible as well as being completely out of the way of the hands of the player. See FIG. 3.

This method can teach standard notation reading by the use of the staff written above the guide. The template enables one to make the staff with ease and the holes can be used for actual notes.

Musical structures such as scales, chords, intervals, etc. are fixed structures in a sense. A major scale for instance, has the same intervallic structure from key to key. If a vocalist sings Do Re Mi Fa Sol La Ti Do (solfeggio) in the key of C it would still be the same song as if that vocalist sang it in the keys of D, E, F, G, etc. The structure of that song, no matter what key it is in, remains unchanged.

As far as fixed structures are concerned, the same thing goes for intervals and scales. They all have specific fixed mathematical structures that can be replicated by using the code that I have developed. One is then able to easily map the musical structure and use it as a guide that indicates which notes to play by the use of visual cues. Because of the fact that these structures are in essence fixed equations they can be used in a chromatic manner on the keyboard.

Figure 2:
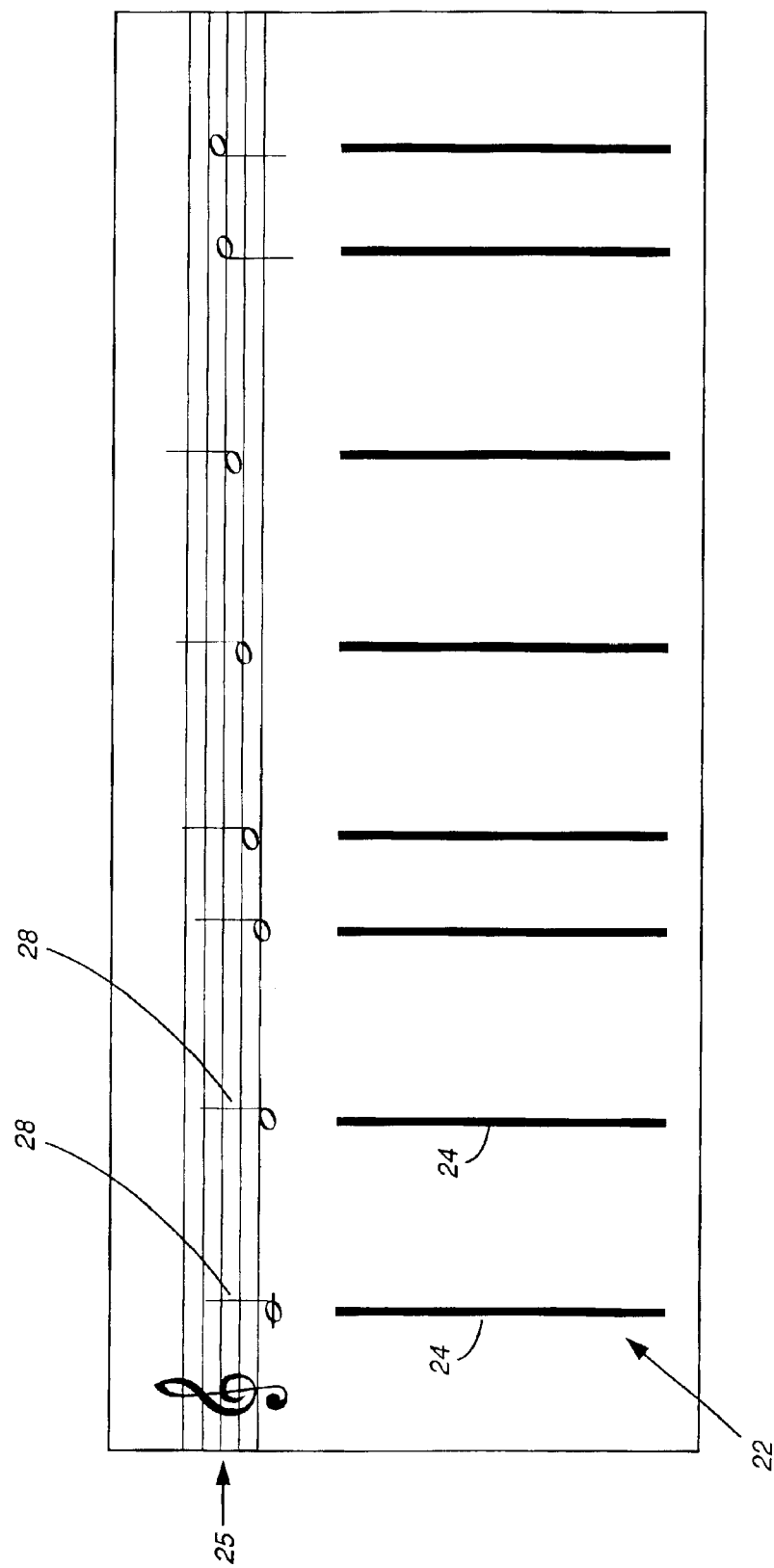
FIG. 2 is a guide prepared by use of the template in accordance with my invention.

The first step in using this tool and method is to instruct the student to take the template 10 and make a guide 22, FIG. 2. For example, if the piano teacher was to instruct the student to make a C Major scale using the template, the student would first place the template on a plain sheet of paper. The student would then select the template code from one of the following codes to draw vertical lines 24 in the various slots designated by the code. For example, to use the template to create the guide for C Major scale, he would use the C major scale root positions: 1 3 5 6 8 10 12 and 13 from the following chart.

I call the Template Codes "Templature".

Major Scale

• ROOT POSITION 1 3 5 6 8 10 12 13

It is noteworthy that this code would apply to every major scale; of which there are 12 in all.

Using this code, the student would insert a pencil or pen through the vertical slots 12, FIG. 1, corresponding to those numbers (that is, indicia) which are printed on the face of the template 10 and produce a guide 22, as shown in FIG. 2.

To draw the staff 25, the student would use the notches 26 in the edge of the template to make dots at each end of the paper and then draw horizontal lines between the dots. To draw the notes 28 on the staff, the student would use the small circles directly above the template slots. Having completed this work, the student would then have a paper guide for the C Major scale.

Next the student would place the guide's first line (made from the template) so that it would be positioned between the keyboard and the fallboard of the piano and would be opposite to the key representing Middle C. See FIG. 3. It is understood that the student would have to be instructed as to what key that was on the piano, and that is normally done by the piano teacher in the first instance.

The following template codes in this chart represent scales, chords and other useful information for the use of template to make guides. For example, the dot "•" over a number represents the key or tonic note of the chord being produced.

TEMPLATE CODES ("Templature")

MAJOR SCALE
    • ROOT POSITION      1 3 5 6 8 10 12 13

MINOR SCALES
    1. NATURAL (ROOT)      1 3 4 6 8 9 11 13
    2. HARMONIC (ROOT)      1 3 4 6 8 9 12 13
    3. MELODIC MINOR (ROOT) •      1 3 4 6 8 10/9 12/11 13
        • PLAY 10 AND 12 ON ASCENDING SCALE (GOING UP)
        • PLAY 11 AND 9 ON DESCENDING SCALE (GOING DOWN)
        • FOR 11 AND 9 USE A BROKEN LINE (RATHER THAN SOLID)

WHOLE TONE SCALE
    • ROOT POSITION      1 3 5 7 9 11 13

DIMINISHED SCALE
    • ROOT POSITION      1 2 4 5 7 8 10 11 13

PENTATONIC
    • ROOT POSITION      1 4 6 (7) 8 11 (12) 13
        The notes in the pentatonic scale that are bracketed are extra notes that go with the pentatonic scale. For 7 and 12 use a broken line.

-continued

| | |
|---|---|
| RETROGRADE SCALE | 1 2 4 6 8 9 11 13 |
| MAJOR CHORD (MAJOR TRIAD) | |
| • ROOT POSITION | 1 5 8 |
| • 1<sup>ST</sup> INVERSION | 1 4 9 |
| • 2<sup>ND</sup> INVERSION | 1 6 10 |
| MAJOR - FLAT 5<sup>TH</sup> | |
| • ROOT POSITION | b5 |
| • 1<sup>ST</sup> INVERSION | 1 5 7 |
| • 2<sup>ND</sup> INVERSION | 1 3 9 |
| • 3rd INVERSION | 1 7 11 |
| SUS 2 CHORD (TRIAD) | |
| • ROOT POSITION | 1 3 8 |
| • 1<sup>ST</sup> INVERSION | 1 6 11 |
| • 2<sup>ND</sup> INVERSION | 1 6 8 |
| SUS 4 CHORD (TRIAD) | |
| • ROOT POSITION | 1 6 8 |
| • 1<sup>ST</sup> INVERSION | 1 3 8 |
| • 2<sup>ND</sup> INVERSION | 1 6 11 |
| DOMINANT 7<sup>TH</sup> (MAJOR) | |
| • ROOT POSITION | 1 5 8 11 |
| • 1<sup>ST</sup> INVERSION | 1 4 7 9 |
| • 2<sup>ND</sup> INVERSION | 1 4 6 10 |
| • 3rd INVERSION | 1 3 7 10 |
| MAJOR 7<sup>TH</sup> (MAJOR) | |
| • ROOT POSITION | 1 5 8 12 |
| • 1<sup>ST</sup> INVERSION | 1 4 8 9 |
| • 2<sup>ND</sup> INVERSION | 1 5 6 10 |
| • 3rd INVERSION | 1 2 6 9 |
| MINOR CHORD (MINOR TRIAD) | |
| • ROOT POSITION | 1 4 8 |
| • 1<sup>ST</sup> INVERSION | 1 5 10 |
| • 2<sup>ND</sup> INVERSION | 1 6 9 |
| DOMINANT 7<sup>TH</sup> (MAJOR) | |
| • ROOT POSITION | 1 4 8 11 |
| • 1<sup>ST</sup> INVERSION | 1 5 8 10 |
| • 2<sup>ND</sup> INVERSION | 1 4 6 9 |
| • 3rd INVERSION | 1 3 6 10 |

MAJOR 7<sup>TH</sup> (MINOR)
- ROOT POSITION     1 4 8 12
- 1<sup>ST</sup> INVERSION     1 5 9 10
- 2<sup>ND</sup> INVERSION     1 5 6 9
- 3rd INVERSION     1 2 5 9

DIMINISHED CHORD (DIMINISHED TRIAD)
- ROOT POSITION     1 4 7
- 1<sup>ST</sup> INVERSION     1 4 7
- 2<sup>ND</sup> INVERSION     1 4 7

AUGMENTED CHORD (AUGMENTED TRIAD)
- ROOT POSITION     1 5 9
- 1<sup>ST</sup> INVERSION     1 5 9
- 2<sup>ND</sup> INVERSION     1 5 9

½ DIMINISHED 7<sup>TH</sup> CHORD/MINOR 7<sup>TH</sup> B5TH (FLATS 5TH)
- ROOT POSITION     1 4 7 11
- 1<sup>ST</sup> INVERSION     1 4 8 10
- 2<sup>ND</sup> INVERSION     1 5 7 10
- 3<sup>RD</sup> INVERSION     1 3 5 9

FULLY DIMINISHED 7<sup>TH</sup> CHORD
- ROOT POSITION     1 4 7 10
- 1<sup>ST</sup> INVERSION     1 4 7 10
- 2<sup>ND</sup> INVERSION     1 4 7 10
- 3<sup>RD</sup> INVERSION     1 4 7 10

MAJOR 6<sup>TH</sup>
- ROOT POSITION     1 5 10
- 1<sup>ST</sup> INVERSION     1 6 9
- 2<sup>ND</sup> INVERSION     1 4 8

MINOR 6<sup>TH</sup>
- ROOT POSITION     1 4 10
- 1<sup>ST</sup> INVERSION     1 7 10
- 2<sup>ND</sup> INVERSION     1 4 7

MAJOR 7<sup>TH</sup> b5 (FLAT 5th)
- ROOT POSITION     1 5 7 11
- 1<sup>ST</sup> INVERSION     1 3 7 9
- 2<sup>ND</sup> INVERSION     1 5 7 11
- 3<sup>RD</sup> INVERSION     1 3 7 9

| -continued | | |
|---|---|---|
| MAJOR 7$^{TH}$ #5 (SHARP 5th) | | |
| • ROOT POSITION | 1 5 9 11 | |
| • 1$^{ST}$ INVERSION | 1 5 7 9 | |
| • 2$^{ND}$ INVERSION | 1 3 5 9 | |
| • 3$^{RD}$ INVERSION | 1 3 7 10 | |
| MINOR 7$^{TH}$ b5 (FLAT 5th) | | |
| • ROOT POSITION | 1 4 7 11 | |
| • 1$^{ST}$ INVERSION | 1 4 8 10 | |
| • 2$^{ND}$ INVERSION | 1 5 7 10 | |
| • 3$^{RD}$ INVERSION | 1 3 6 9 | |
| MAJOR 7$^{TH}$ #5 (SHARP 5th) | | |
| • ROOT POSITION | 1 5 9 11 | |
| • 1$^{ST}$ INVERSION | 1 5 7 9 | |
| • 2$^{ND}$ INVERSION | 1 3 5 9 | |
| • 3$^{RD}$ INVERSION | 1 3 7 11 | |

INTERVALS (The larger the interval, the larger the width)

| | HARMONIC - PLAYED TOGETHER | MELODIC - PLAYED SEPARATELY |
|---|---|---|
| Minor 2$^{nd}$ | 1 - 2 | 1 - 2 |
| Major 2$^{nd}$ | 1 - 3 | 1 - 3 |
| Minor 3$^{rd}$ | 1 - 4 | 1 - 4 |
| Major 3$^{rd}$ | 1 - 5 | 1 - 5 |
| Perfect 4$^{th}$ | 1 - 6 | 1 - 6 |
| Augmented 4$^{th}$ | 1 - 7 | 1 - 7 |
| Diminished 5$^{th}$ | 1 - 7 | 1 - 7 |
| Perfect 5$^{th}$ | 1 - 8 | 1 - 8 |
| Minor 6$^{th}$ | 1 - 9 | 1 - 9 |
| Major 6$^{th}$ | 1 - 10 | 1 - 10 |
| Minor 7$^{th}$ | 1 - 11 | 1 - 11 |
| Major 7$^{th}$ | 1 - 12 | 1 - 12 |
| Perfect octave | 1 - 13 | 1 - 13 |

SOLFEGGIO SCALES

| MAJOR SCALE (DO BASED) | | | | | | | | MINOR SCALES (LA BASED) | | | | | | | |
|---|---|---|---|---|---|---|---|---|---|---|---|---|---|---|---|
| Do | Re | Mi | Fa | Sol | La | Ti | Do | | | | | | | | |
| 1 | 3 | 5 | 6 | 8 | 10 | 11 | 12 | | | | | | | | |
| | | | | | | | | Natural minor | | | | | | | |
| | | | | | | | | La | Ti | Do | Re | Mi | Fa | Sol | La |
| | | | | | | | | 1 | 3 | 4 | 6 | 8 | 9 | 11 | 13 |
| | | | | | | | | Harmonic minor | | | | | | | |
| | | | | | | | | La | Ti | Do | Re | Mi | Fa | Si | La |
| | | | | | | | | 1 | 3 | 4 | 6 | 8 | 9 | 12 | 13 |
| | | | | | | | | Melodic minor Ascending scale: | | | | | | | |
| | | | | | | | | La | Ti | Do | Re | Mi | Fi | Si | La |
| | | | | | | | | 1 | 3 | 4 | 6 | 8 | 9 | 12 | 13 |
| | | | | | | | | Descending scale: | | | | | | | |
| | | | | | | | | La | Sol | Fa | Mi | Re | Do | Ti | La |
| | | | | | | | | 13 | 11 | 9 | 8 | 6 | 4 | 3 | 1 |

This template may be used to create more than one octave. The template can be shifted, and the 1 slot on the template can be aligned with 13 on the guide in order to extend the scale or chord beyond one octave. Thus, the guide would now have two octaves. Repeat this process for more octaves. This will enable the user to make 9$^{th}$, 11$^{th}$ and 13 chords and all their inversions.

Using the guide, the student can now play C Major scale by use of the visual cues represented by the lines on the guide. The notes can be played one stroke at a time in a "play-by-line" method—left to right for ascending scale.

To play other major scales, the student need only slide the guide to the right or left to any particular other lettered key and then "play-by-line" again.

Figure 4:
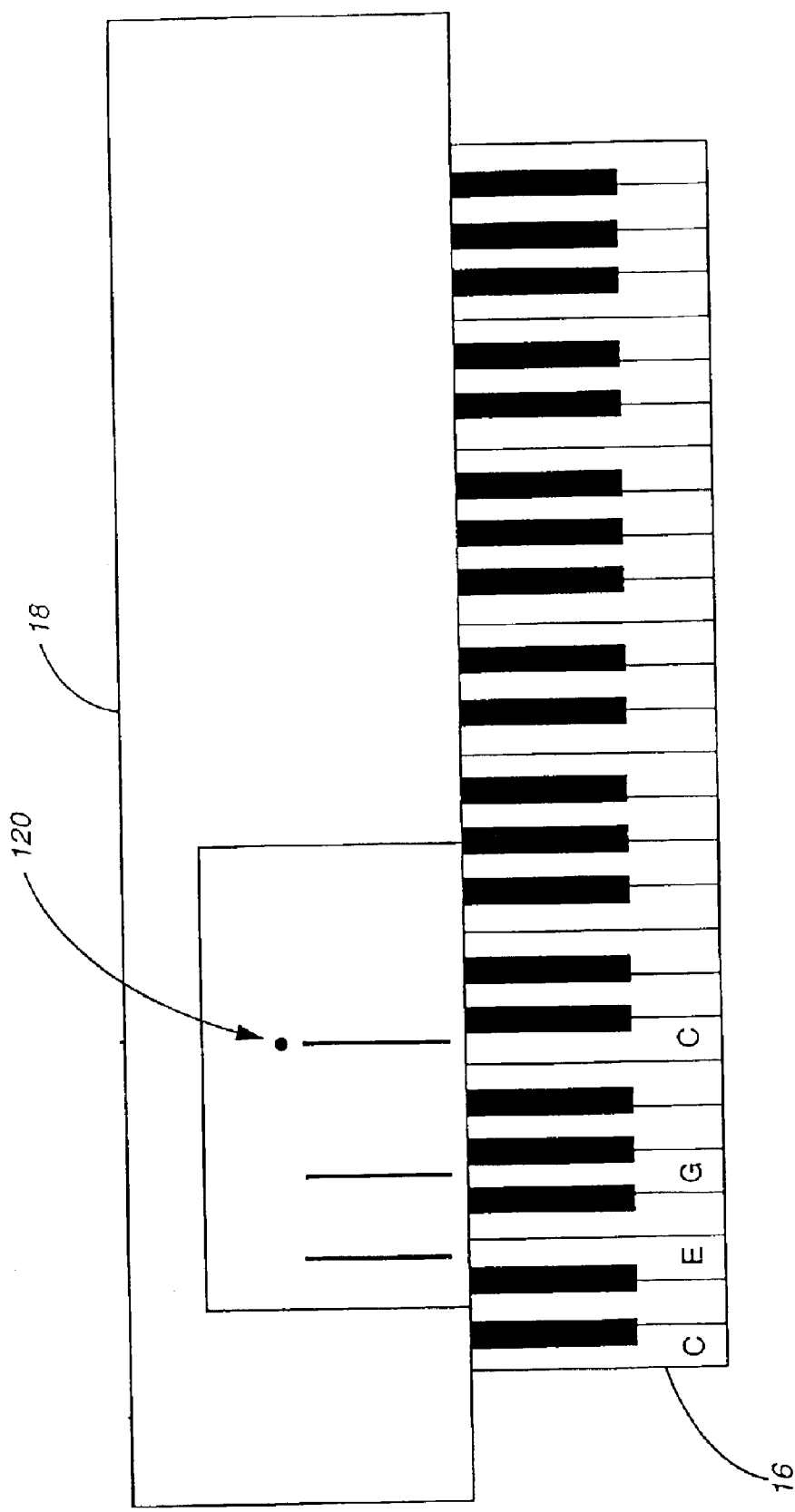
FIG. 4 shows another guide prepared in accordance with my invention.

The dot above each slot has multiple functions. First, the dot at 1 on the template can be filled in when creating a guide for the scale. The line on the guide so created will line up with a note. Whatever note the dot is above tells us the sonority (key) of that structure. Not every chord will be mapped onto a guide in its root position. This function becomes handy especially when creating the types of chords called inversions. See FIG. 4. To make a guide for 1$^{st}$ inversion, the dot is placed over the tonic note (the key) of the chord being mapped onto a guide 120. In the first inversion, instead of playing C E G, which would be the root position, the student would play E G C, which is the first inversion. Note the dot is placed over the C note on the guide to create the C inversion; and the dot needs to be placed at C.

METHOD

A piece of paper (8-½×11 inches) can be use to make the guide. It works best if 20 lb. printer paper is used but works with any paper that is at least the size of the template. If 8-½×11-inch paper is used, fold the paper lengthwise thus rendering a 4×11-inch piece of paper. The template is then placed on top of the paper lengthwise. The guide is then created by using pencil or pen to fill in numbers that correspond to a particular code. For instance, if a particular code was defined as 1 5 8, fill in those numbers with the chosen implement by marking through the template onto the paper.

Take the guide over to the piano keyboard, align the first line on the guide to any note. Once this is done, the musical structure (scale, chord, interval, etc.) can be played because the lines created by the use of this unique template and method will align perfectly with the note centers and if one simply plays the notes that are indicated by those lines then that individual will be playing that musical structure.

Within the process of learning music, there are many details to be thinking about. These may include learning the individual note names or learning how different notes may be held longer or shorter than other notes. There is the issue of rhythm, and let us not forget musical notation. These are just some of many details (actually dozens) to be mindful of.

In developing this technical method I have incorporated the use of concrete visual aids to assist in the learning process.

My method enables the student to play complex musical structures that normally take months if not years to teach through traditional methods, within the beginning minutes of the first one-hour lesson. Because my template/guide makes use of the visual sense to teach music, students will be able to start learning piano at earlier ages. This method will also take away some of the complexities that exist in teaching. A teacher will be able to use this method to develop strength in the fingers. It will also help to develop the ear. This method will engrave on the mind the image of the fixed visual structures that represent various musical structures. As a result of developing this revolutionary method and tool for teaching piano I have also created a new type of musical notation. By using the template, we are writing this new kind of notation I refer to as "templature."

The template ("templature") method reduces the amount of intellectual energy used. What that means is that my method lets one learn by use of visual cues rather than words. When students get immediate results, it is a positive reinforcement; and therefore it is more likely that the students will be more motivated and as a result, more successful playing piano.

This system/method is not limited to new piano students. Advanced piano students will use this method/tool as well. Even advanced students do not always know how to play all the scales or a chord in every key instantly. With this method/tool this can be accomplished simply, quickly and without embarrassment.

This method/tool can be used by musicians other than pianists, such as vocalists. A vocalist will be able to play scales easily. A vocalist will be able to play chords and harmonic progressions, intervals and warm-ups for voice and ear training. Using the sliding guide enables the vocalist to easily transpose keys.

It may also be used by a guitarist or violinist who wants to write music on the piano. This method/tool may be utilized by music theory professors to teach structure. It will also enhance a composer's ability to map out advanced scales and chords. The composer may also use this as a ruler for music as well. It will enable one to easily transpose musical works into different keys.

In order to make staffs, I provide a plurality of notches (preferably 5 in number) on the edge of the template. These notches can be used to make marks on the guide at each end thereof and then horizontal lines can be drawn between these marks to make a staff.

A grand staff can be made by having two sets of these notches—ten in all—one for each clef, that is, a treble clef and a base clef.

I have described a template means for use in creating a guide for piano players to guide them in selecting piano keys to be stroked; said template means comprising a template having a plurality of elongated slots spaced from one another at intervals selected to correspond to the intervals existing from one piano key to another piano key.

On the template means, I have placed indicia identifying the slots.

I have also described a method of teaching piano comprising the steps of making a guide comprising a plurality of vertical lines from a template having a plurality of elongated slots therein and placing the guide in juxtaposition with the keys of the piano so that the piano player can play those keys identified by the lines.

What is claimed is:

1. A template means for use in creating a guide for piano players to guide them in selecting the physical piano keys to be stroked on a piano keyboard; said template means comprising a template having a plurality of elongated slots spaced from one another at intervals selected to correspond to the intervals existing from one physical piano key to another physical piano key on a piano keyboard to thereby provide a means to place marks on the guide through the slots to correspond to physical piano keys to be stroked.

2. The template means of claim 1 wherein the intervals are substantially equidistant to one another.

3. The template means of claim 1 wherein there are at least 13 slots in the template.

4. The template means of claim 1 wherein indicia are provided on the template identifying at least some of the slots.

5. The template means of claim 4 wherein the indicia are successive numbers from 1 through at least 13.

6. The template means of claim 1 wherein a plurality of hole are provided spaced from the longitudinal ends of said slots.

7. The template means of claim 6 wherein the holes are round.

8. The template means of claim 1 wherein a plurality of notches are provided along at least one edge of said template.

9. The template means of claim 8 having at least five notches.

10. The template means of claim 8 having ten notches.

11. A method of teaching piano comprising the steps of making a guide comprising a plurality of vertical lines from a template having a plurality of elongated slots therein spaced from one another at intervals selected to correspond to the intervals existing from one physical piano key to another physical piano key on a piano keyboard and placing the guide in juxtaposition with the physical keys of the piano, so that the piano player is thereby guided to stroke those physical keys juxtaposed to the lines.

12. The method of claim 11 wherein, in the making of the lines, groups of lines are selected in accordance with root positions selected from the group of template codes consisting of:

MAJOR SCALE
- ROOT POSITION        1 3 5 6 8 10 12 13

MINOR SCALES
1. NATURAL (ROOT)        1 3 4 6 8 9 11 13
2. HARMONIC (ROOT)        1 3 4 6 8 9 12 13
3. MELODIC MINOR (ROOT) •        1 3 4 6 8 10/9 12/11 13
   - PLAY 10 AND 12 ON ASCENDING SCALE (GOING UP)
   - PLAY 11 AND 9 ON DESCENDING SCALE (GOING DOWN)
   - FOR 11 AND 9 USE A BROKEN LINE (RATHER THAN SOLID)

WHOLE TONE SCALE
- ROOT POSITION        1 3 5 7 9 11 13

DIMINISHED SCALE
- ROOT POSITION        1 2 4 5 7 8 10 11 13

PENTATONIC
- ROOT POSITION        1 4 6 (7) 8 11 (12) 13
  The notes in the pentatonic scale that are bracketed are extra notes that go with the pentatonic scale. For 7 and 12 use a broken line.

RETROGRADE SCALE        1 2 4 6 8 9 11 13

MAJOR CHORD (MAJOR TRIAD)
- ROOT POSITION        1 5 8
- 1$^{ST}$ INVERSION        1 4 9
- 2$^{ND}$ INVERSION        1 6 10

MAJOR - FLAT 5$^{TH}$
- ROOT POSITION        b5
- 1$^{ST}$ INVERSION        1 5 7
- 2$^{ND}$ INVERSION        1 3 9
- 3rd INVERSION        1 7 11

SUS 2 CHORD (TRIAD)
- ROOT POSITION        1 3 8
- 1$^{ST}$ INVERSION        1 6 11
- 2$^{ND}$ INVERSION        1 6 8

SUS 4 CHORD (TRIAD)
- ROOT POSITION        1 6 8
- 1$^{ST}$ INVERSION        1 3 8
- 2$^{ND}$ INVERSION        1 6 11

DOMINANT 7$^{TH}$ (MAJOR)
- ROOT POSITION        1 5 8 11
- 1$^{ST}$ INVERSION        1 4 7 9
- 2$^{ND}$ INVERSION        1 4 6 10
- 3rd INVERSION        1 3 7 10

-continued

MAJOR 7<sup>TH</sup> (MAJOR)
- ROOT POSITION    1 5 8 12
- 1<sup>ST</sup> INVERSION    1 4 8 9
- 2<sup>ND</sup> INVERSION    1 5 6 10
- 3rd INVERSION    1 2 6 9

MINOR CHORD (MINOR TRIAD)
- ROOT POSITION    1 4 8
- 1<sup>ST</sup> INVERSION    1 5 10
- 2<sup>ND</sup> INVERSION    1 6 9

DOMINANT 7<sup>TH</sup> (MAJOR)
- ROOT POSITION    1 4 8 11
- 1<sup>ST</sup> INVERSION    1 5 8 10
- 2<sup>ND</sup> INVERSION    1 4 6 9
- 3rd INVERSION    1 3 6 10

MAJOR 7<sup>TH</sup> (MINOR)
- ROOT POSITION    1 4 8 12
- 1<sup>ST</sup> INVERSION    1 5 9 10
- 2<sup>ND</sup> INVERSION    1 5 6 9
- 3rd INVERSION    1 2 5 9

DIMINISHED CHORD (DIMINISHED TRIAD)
- ROOT POSITION    1 4 7
- 1<sup>ST</sup> INVERSION    1 4 7
- 2<sup>ND</sup> INVERSION    1 4 7

AUGMENTED CHORD (AUGMENTED TRIAD)
- ROOT POSITION    1 5 9
- 1<sup>ST</sup> INVERSION    1 5 9
- 2<sup>ND</sup> INVERSION    1 5 9

½ DIMINISHED 7<sup>TH</sup> CHORD/MINOR 7<sup>TH</sup> B5TH (FLATS 5TH)
- ROOT POSITION    1 4 7 11
- 1<sup>ST</sup> INVERSION    1 4 8 10
- 2<sup>ND</sup> INVERSION    1 5 7 10
- 3<sup>RD</sup> INVERSION    1 3 5 9

FULLY DIMINISHED 7<sup>TH</sup> CHORD
- ROOT POSITION    1 4 7 10
- 1<sup>ST</sup> INVERSION    1 4 7 10
- 2<sup>ND</sup> INVERSION    1 4 7 10
- 3<sup>RD</sup> INVERSION    1 4 7 10

-continued

| | | |
|---|---|---|
| MAJOR 6<sup>TH</sup> | | |
| • | ROOT POSITION | 1 5 10 |
| • | 1<sup>ST</sup> INVERSION | 1 6 9 |
| • | 2<sup>ND</sup> INVERSION | 1 4 8 |
| MINOR 6<sup>TH</sup> | | |
| • | ROOT POSITION | 1 4 10 |
| • | 1<sup>ST</sup> INVERSION | 1 7 10 |
| • | 2<sup>ND</sup> INVERSION | 1 4 7 |
| MAJOR 7<sup>TH</sup> b5 (FLAT 5th) | | |
| • | ROOT POSITION | 1 5 7 11 |
| • | 1<sup>ST</sup> INVERSION | 1 3 7 9 |
| • | 2<sup>ND</sup> INVERSION | 1 5 7 11 |
| • | 3<sup>RD</sup> INVERSION | 1 3 7 9 |
| MAJOR 7<sup>TH</sup> #5 (SHARP 5th) | | |
| • | ROOT POSITION | 1 5 9 11 |
| • | 1<sup>ST</sup> INVERSION | 1 5 7 9 |
| • | 2<sup>ND</sup> INVERSION | 1 3 5 9 |
| • | 3<sup>RD</sup> INVERSION | 1 3 7 10 |
| MINOR 7<sup>TH</sup> b5 (FLAT 5th) | | |
| • | ROOT POSITION | 1 4 7 11 |
| • | 1<sup>ST</sup> INVERSION | 1 4 8 10 |
| • | 2<sup>ND</sup> INVERSION | 1 5 7 10 |
| • | 3<sup>RD</sup> INVERSION | 1 3 6 9 |
| MAJOR 7<sup>TH</sup> #5 (SHARP 5th) | | |
| • | ROOT POSITION | 1 5 9 11 |
| • | 1<sup>ST</sup> INVERSION | 1 5 7 9 |
| • | 2<sup>ND</sup> INVERSION | 1 3 5 9 |
| • | 3<sup>RD</sup> INVERSION | 1 3 7 11 |

INTERVALS (The larger the interval, the larger the width)

| HARMONIC - PLAYED TOGETHER | | MELODIC - PLAYED SEPARATELY |
|---|---|---|
| Minor 2<sup>nd</sup> | 1 - 2 | 1 - 2 |
| Major 2<sup>nd</sup> | 1 - 3 | 1 - 3 |
| Minor 3<sup>rd</sup> | 1 - 4 | 1 - 4 |
| Major 3<sup>rd</sup> | 1 - 5 | 1 - 5 |
| Perfect 4<sup>th</sup> | 1 - 6 | 1 - 6 |
| Augmented 4<sup>th</sup> | 1 - 7 | 1 - 7 |
| Diminished 5<sup>th</sup> | 1 - 7 | 1 - 7 |
| Perfect 5<sup>th</sup> | 1 - 8 | 1 - 8 |
| Minor 6<sup>th</sup> | 1 - 9 | 1 - 9 |
| Major 6<sup>th</sup> | 1 - 10 | 1 - 10 |
| Minor 7<sup>th</sup> | 1 - 11 | 1 - 11 |
| Major 7<sup>th</sup> | 1 - 12 | 1 - 12 |
| Perfect octave | 1 - 13 | 1 - 13 |

SOLFEGGIO SCALES

| MAJOR SCALE (DO BASED) | MINOR SCALES (LA BASED) |
|---|---|

-continued

| Do | Re | Mi | Fa | Sol | La | Ti | Do | | | | | | | |
|---|---|---|---|---|---|---|---|---|---|---|---|---|---|---|
| 1 | 3 | 5 | 6 | 8 | 10 | 11 | 12 | | | | | | | |

Natural minor

| | | | | | | | | La | Ti | Do | Re | Mi | Fa | Sol | La |
|---|---|---|---|---|---|---|---|---|---|---|---|---|---|---|---|
| | | | | | | | | 1 | 3 | 4 | 6 | 8 | 9 | 11 | 13 |

Harmonic minor

| | | | | | | | | La | Ti | Do | Re | Mi | Fa | Si | La |
|---|---|---|---|---|---|---|---|---|---|---|---|---|---|---|---|
| | | | | | | | | 1 | 3 | 4 | 6 | 8 | 9 | 12 | 13 |

Melodic minor
Ascending scale:

| | | | | | | | | La | Ti | Do | Re | Mi | Fi | Si | La |
|---|---|---|---|---|---|---|---|---|---|---|---|---|---|---|---|
| | | | | | | | | 1 | 3 | 4 | 6 | 8 | 9 | 12 | 13 |

Descending scale:

| | | | | | | | | La | Sol | Fa | Mi | Re | Do | Ti | La |
|---|---|---|---|---|---|---|---|---|---|---|---|---|---|---|---|
| | | | | | | | | 13 | 11 | 9 | 8 | 6 | 4 | 3 | 1 | wherein the dot "•" over a number represents the tonic note of the chord being produced.

\* \* \* \* \*